United States Patent Office 3,528,916
Patented Sept. 15, 1970

3,528,916
PROCESS FOR PREPARING OVERBASED BARIUM SALTS OF HYDROCARBON-PHOSPHORUS SULFIDE REACTION PRODUCTS
Larry G. Snyder, Port Arthur, and Ralph P. Chesluk, Nederland, Tex., assignors to Texaco Inc., New York, N.Y., a corporation of Delaware
No Drawing. Filed Jan. 23, 1968, Ser. No. 699,779
Int. Cl. C10m 1/10, 1/48
U.S. Cl. 252—32.7                              4 Claims

ABSTRACT OF THE DISCLOSURE

A process for preparing a lubricating oil concentrate of an overbased barium salt of a hydrolyzed hydrocarbon-phosphorus sulfide reaction product useful as a detergent dispersant additive comprising the steps of (1) contacting a hydrocarbon with phosphorus sulfide, (2) forming a mineral oil concentrate of the resultant reaction product, (3) hydrolyzing said concentrate of the resultant reaction product with steam until a neutralization number (ASTM D974) of between 60 and 65 is obtained, (4) drying the hydrolyzed concentrate, (5) contacting said dried concentrate with anhydrous methanol to form an extract phase and raffinate phase, (6) contacting said raffinate phase with a basic barium inorganic compound and carbon dioxide in the presence of anhydrous methanol, (7) contacting the resultant mixture with steam, (8) contacting the hydrolyzed reaction mixture with carbon dioxide and (9) filtering the resultant dried mixture to form a clarified lubricating oil concentrate of the overbased barium salt of a hydrolyzed hydrocarbon-phosphorus acid reaction product.

BACKGROUND OF THE INVENTION

Field of invention

This invention is in the field of art relating to sulfurized hydrocarbons of undetermined constitution.

Description of the prior art

The carbonated basic barium salts of hydrolyzed hydrocarbon-phosphorus sulfide reaction products are well known detergent and dispersant additives for motor oils. Further, it has been recognized that the overbased (basic) salts of hydrocarbon-phosphorus sulfide product, that is, salts having higher metal contents than mere neutral (i.e. normal) salts are more effective engine oil detergents on a weight basis than neutral oils. One of the methods of preparing these overbased salts is set forth in U.S. 3,135,729 wherein the preparation of alkaline metal salts of hydrolyzed hydrocarbon-phosphorus sulfide are disclosed. Briefly, the prior method comprises contacting hydrocarbon-phosphorus sulfide, forming a mineral oil concentrate, hydrolyzing with steam, drying the concentrate to hydrolyzed concentrate, contacting the dried concentrate with anhydrous methanol to form a raffinate and extract phase, reacting the raffinate phase with alkaline earth metal inorganic compound in the presence of methanol, removing methanol, adding water, subsequently drying the reaction mixture to form a concentrate of the hydrolyzed hydrocarbon phosphonic acid salt. Although this prior method was a significant improvement over many of those of the prior art at that time, it has the disadvantage of producing a concentrate which did not filter at an entirely acceptable commercial rate to form a clarified product. Clarification of the product is important since its use in the motor additives requires it to be in the clear state in order to obtain customer approval.

SUMMARY OF THE INVENTION

We have discovered a method of preparing lubricating oil concentrate of an overbased barium salt of a hydrolyzed hydrocaron-phosphorus sulfide reaction product of substantially improved filterability. More specifically, we have unexpectedly discovered in the general method of preparing a mineral oil concentrate of a carbonated overbased barium salt of an inorganic phosphorus acid free hydrolyzed hydrocarbon-phosphorus sulfide product that it is critical to hydrolyze the hydrocarbon-phosphorus sulfide intermediate reaction product to a neutralization number (ASTM D974) of between about 60 and 65 and to steam hydrolyze rather than water hydrolyze the barium salt intermediate product in order to produce a significant improvement in filterability of the final product.

DETAILED DESCRIPTION OF THE INVENTION

Specifically, the method of the invention comprises contacting a hydrocarbon with phosphorus sulfide, advantageously at a temperature between about 200 and 500° F. in a non-oxidizing atmosphere, for example, under a blanket of nitrogen advantageously in the presence of a small amount of sulfur (e.g. between about 0.1 and 1.0 wt. percent on the hydrocarbon) utilizing between about 5 and 40 wt. percent phosphorus sulfide reagent based on the hydrocarbon. On a molar basis the hydrocarbon and phosphorus sulfide are usually present in amounts between about two and one moles of hydrocarbon per mole of phosphorus sulfide. The reaction time in this first stage is normally between about 4 and 12 hours.

Subsequent to the reaction of the hydrocarbon and phosphorus sulfide, the reaction product is diluted with a mineral lubricating oil advantageously having an SUS viscosity at 100° F. between about 50 and 200. One of the more preferred mineral oil diluents is a paraffin base distillate having an SUS viscosity at 100° F. of about 100 being preferred. The amount of diluent lubricating oil employed is in no way critical to the method of the process but generally it should be sufficient to produce a readily fluid product and is normally present in an amount of between about 50 and 150 wt. percent based on the hydrocarbon reaction product. The purpose of mineral oil dilution is to facilitate subsequent reaction, handling, stability and incorporation in motor oils.

The hydrocarbon-phosphorus sulfide reaction product in mineral oil is then hydrolyzed by contact with steam desirably at temperatures between about 200 and 500° F. The steam is normally introduced directly into the mineral oil concentrate. The steaming is continued under these conditions until a neutralization number (Neut. No.) of between 60 and 65 (ASTM D974) is obtained. The Neut. No. determination and termination of steaming can be readily ascertained by periodically removing samples of the ingredients from the reactor and making an analysis thereon. In this hydrolysis step if steaming is terminated prior to reaching a Neut. No. of about 60 or continued until Neut. No. above about 65 is obtained, the filterability and clarity of the crude final product is substantially reduced. The reason why the Neut. No. of the hydrolyzed $P_2S_5$ reaction product affects the filterability and clarity of the final barium salt concentrate is not fully understood but is theorized that the hydrolysis forms a multitude of organic products in addition to the inorganic phosphorus acid and the particular make-up of this complex organic hydrolyzed hydrocarbon-phosphorus sulfide mixture varies depending on Neut. No. A Neut. No. of between 60 and 65 apparently characterizes a complex mixture which forms final barium salt products having relatively outstanding filterability which upon filtration also produce a product which is clear.

Prior to the next step the steamed hydrolyzed product is dried, e.g., by passing an inert gas such as nitrogen therethrough at a temperature between about 200 and 500° F. This drying step is normally conducted for a period of between 1 and 4 hours.

As a next step, the undesired corrosive inorganic phosphorus acids formed during the hydrolysis of the hydrocarbon olefin reaction product are separated therefrom by extraction with anhydrous methanol at a temperature between about 50 and 140° F. and advantageously at atmospheric pressure. Higher temperatures may be used if higher pressures are used but no advantages are obtained thereby. The anhydrous methanol solvent is employed advantageously in an amount between about 0.25 and 1 volume methanol per volume of mineral oil concentrate of hydrolyzed olefin-$P_2S_5$ reaction product. The usual dosage of methanol is equal to one-half volume to that of the concentrate of hydrolyzed olefin-$P_2S_5$ product. Treatment of the hydrolyzed olefin-$P_2S_5$ reaction product with anhydrous methanol results in the formation of an extract phase containing the inorganic phosphorus acid and a raffinate phase containing the hydrolyzed hydrocarbon-phosphorus sulfide product. The extract phase is discarded or set aside for methanol recovery.

Various techniques can be employed for the extraction of the mineral oil concentrate of hydrolyzed hydrocarbon-$P_2S_5$ reaction product. Continuous countercurrent extraction in a tower, batch extraction employing mixing devices and more complicated devices such as Stratco contactors and Podbielniak extractors can be employed for the extraction. It has been found particularly advantageous to effect contact of the methanol with the mineral oil concentrate passing the methanol mineral oil concentrate through a gear pump which effects excellent contacting between the solvent and mineral lubricating oil concentrate. Separation of the methanol extract phase from the raffinate phase can be effected by passage through a centrifuge or by settling.

The inorganic phosphorus acid free hydrolyzed hydrocarbon-phosphorus sulfide reaction product is then neutralized with a basic barium inorganic compound which is usually barium oxide or barium hydroxide. The preferred basic inorganic barium compounds used in the neutralization and overbasing are barium hydroxide and barium oxide. The barium compound is employed in an amount between 1 and 2 moles per mole of hydrolyzed hydrocarbon-phosphorus sulfide reaction product. This results in the formation of a basic salt. The inorganic barium compound contact takes place in the presence of between about 5 and 40 moles of anhydrous methanol per mole of inorganic phosphorus acid free hydrolyzed hydrocarbon-phosphorus sulfide reaction product. The reaction of the inorganic barium compound with the lube oil concentrate is accompanied and/or followed by the $CO_2$ blowing of the reaction mixture desirably at a temperature between about 140 and 300° F. and utilizing a mole ratio of $CO_2$ to inorganic barium compound of between about 0.5:1 and 2:1. It is theorized in these steps the inorganic barium compound reacts with acidic members to form neutral salts and that the excess barium compound reacts with the methyl alcohol to form a barium methylate intermediate which in turn is converted to barium carbonate and/or a barium methylate carbon dioxide complex upon carbonation.

The reaction mixture is then contacted with steam advantageously at a temperature between about 150 and 200° F. utilizing between about 0.5 and 4 moles of steam per mole of hydrolyzed hydrocarbon-phosphorus sulfide product. The addition of steam hyrolyzes any formed barium methylate-carbon dioxide complex and substantially reduces the gel forming tendencies of the final mineral oil concentrate. Surprisingly, it has been found if water is substituted for steam in this step the final product concentrate is undesirably substantially more viscous for a given set of conditions, and therefore, substantially less filterable. This is even more surprising since desirably low viscosities are obtained with either wet steam or dry steam.

The hydrolyzed reaction mixture is again contacted with $CO_2$ at between about 0.5 and 4 moles per mole reaction product at between about 170 and 350° F. in order to insure complete carbonation and to assist in drying the reaction mixture.

Following the second $CO_2$ contact the reaction mixture may be further dried, e.g., by stripping with inert gas, e.g., nitrogen at between about 250 and 350° F.

The resultant dried reaction mixture is then filtered through standard filter apparatus such as pressure filters having stainless steel or cloth plates desirably precoated with a filter aid such as diatomaceous earth. Generally filtration temperatures of between about 250 and 350° F. and pressures between about 10 and 80 p.s.i.g. are employed. Filter aids may also be used in the mix to be filtered in amounts between about 0.5 and 4 wt. percent based on said mix. The resultant filtrate is the desired lubricating oil concentrate of the invention.

Although the hydrocarbon reacted with the phosphorus sulfide can be an aromatic hydrocarbon, a cycloaliphatic hydrocarbon or aliphatic hydrocarbon, olefins are almost generally employed as the hydrocarbon reactant. The olefinic hydrocarbon reacted with phosphorus sulfide usually contains at least 12 carbon atoms although lower molecular weights can be employed. Mono-olefinic polymers such as isobutylene polymer, butylene polymer, propylene polymer and copolymers of mono-olefins such as propylene-isobutylene copolymers are particularly preferred materials for reaction with phosphorus sulfide. In general mono-olefin polymers and copolymers having an average molecular weight between about 400 and 5000 are employed as the hydrocarbon reactant with polymers and copolymers having an average molecular weight in the range of 600 to 2000 being particularly preferred. A specific example of a preferred polymer is a polybutene of a molecular weight of about 800. Copolymers of conjugated dienes and mono-olefins such as copolymer of butadiene and isobutylene having an average molecular weight in the above prescribed range also react with phosphorus sulfides to give lubricant additives.

Although phosphorus sulfide such as $P_2S_5$, $P_4S_7$ and $P_4S_3$ may be used as the phosphorus sulfide reactant, phosphorus pentasulfide, $P_2S_5$, is usually employed in substantially all commercial preparations because of its availability and cost.

Examples of the inorganic basic barium compound reactants contemplated herein are barium oxide and barium hydroxide.

Antifoamants in amounts of between about 50 and 600 p.p.m. may be employed in the reaction mixture. Specific examples are the dimethylsilicones and polysiloxanes.

Surface active agents may be also employed during the salt forming reaction stage as fluidizing agents in amounts of between about .005 and .05 wt. percent based on the reaction mixture. Specific examples of suitable surface active agents are nonylphenate-ethylene oxide adducts, 2-methoxyethanol, adducts of ethylene oxide and tridecyl alcohol and the reaction products of ethylene oxide and hydrogenated fatty acid.

The process of the invention is further illustrated by the following examples but they are not to be construed as limitations thereof.

*Example I.*—This example illustrates the method of the invention.

To a 100 gallon steel glass lined reactor there was charged 175 pounds of polyisobutene of an average molecular weight of about 800, 2.3 lbs. sulfur, 45.5 lbs. phosphorus pentasulfide. The reactor contents were stirred and heated to 450° F. and were nitrogen blown to aid in the removal of by-product hydrogen sulfide. The reaction was run for 9 hours at 450° F. while nitrogen stripping. The resultant polybutene-phosphorus pentasulfide condensation product was cooled to 300° F. and diluted with 241 lbs. of paraffinic lubricating oil of an SUS viscosity of about 100 at 100° F. Fifty grams of dimethyl silicone antifoamant were added to reduce foaming. The condensation product was then contacted with 58.5 lbs. of steam for 10 hours at 360° F. The Neut. No. of the steam hydrolyzed product was 64.9. The resulting by-product was then nitrogen stripped for 2 hours at 360° F. The dried product was cooled to 140° F. and mixed with 198 lbs. methanol and stirred for 4 hours at 125–135° F. The mixture was permitted to settle for 6 hours at 125–135° F. The raffinate was separated from the extract through gravity separation. To the resultant raffinate there was charged 88 lbs. of methanol followed by charging of a slurry of 23.3 lbs. barium oxide plus 14 lbs. of naphthenic mineral oil of 100 SUS viscosity at 100° F. while keeping the reactor temperature less than 140° F. To the reactor there was then added 6.3 lbs. of nonylphenate-ethylene oxide adduct surface active agent and 50 grams of dimethylsilicone antifoamant.

Finally 200 lbs. of the previously prepared raffinate was charged and the entire mixture was stirred for one-half hour at 140° F. The mixture was heated to 160° F. and carbon dioxide blown. Carbon dioxide blowing was continued for 2½ hours. The resulting barium salt was hydrolyzed with steam (equivalent to 6½ lbs. water) at 160–170° F. for 1.5 hours. The mixture was then $CO_2$ blown while heating and holding at 300° F. The subsequent overbased barium product was pressure filtered on a 2 ft.² filter coated with a 0.2 inch thickness of diatomaceous earth at a pressure of 25 p.s.i.g. at a temperature of 300° F.

The recovered filtered product was determined to be a lube oil concentrate containing an overbased carbonated barium salt of hydrolyzed polybutene-phosphorus pentasulfide reaction product, said concentrate having the following analysis:

TABLE I

| Test: | Result |
|---|---|
| Water, wt. percent | 0.2 |
| Specific gravity, 60/60° F. | 1.0032 |
| Flash, COC, ° F. | |
| Color, ASTM (Dil.) | <4.5 |
| Sulfur, wt. percent | 0.66 |
| Barium, wt. percent | 7.5 |
| Phosphorus, wt. percent | 0.92 |
| Lumetron turbidity | 3.5 |
| $H_2S$, p.p.m. | 1 |
| Kin. visc., cs. at 210° F. | 117.16 |
| Mineral oil content, wt. percent | 53.3 |

*Example II.*—This example illustrates the criticality in respect to filtration of final product in the method of the invention of maintaining the neutralization number of the produced hydrolyzed hydrocarbon polysulfide intermediate in the neutralization number range of between about 60 and 65. The procedure employed is broadly that outlined in Example I. The test data and results are outlined below in Table II:

TABLE IIA.—PREPARATION OF INORGANIC-PHOSPHORUS ACID FREE HYDROLYZED $P_2S_5$ POLYBUTENE RAFFINATE

| | A | B | C | D | E | F |
|---|---|---|---|---|---|---|
| Charge, lbs.: | | | | | | |
| Polybutene, 800 m.w. | 175 | 175 | 47.5 | 47.5 | 47.5 | 47.5 |
| Sulfur | 2.25 | 2.25 | 0.664 | 0.664 | 0.664 | 0.664 |
| $P_2S_5$ | 45.5 | 45.5 | 12.3 | 12.3 | 12.3 | 12.3 |
| Mineral oil (100 SUS, 100° F.) | 241 | 241 | 65.5 | 65.5 | 65.5 | 65.5 |
| Water (steam) | 58.5 | 58.5 | 11.5 | 13 | 18 | 13.3 |
| Methanol | 198 | 198 | 63 | 63 | 63 | 63 |
| Dimethylsilicone | 50 | 50 | 20 | 20 | 20 | 20 |
| Procedure: | | | | | | |
| Charge polybutene $P_2S_5$, sulfur: | | | | | | |
| Time, hrs. | 1.5 | 1.5 | 1 | 1.5 | 1.5 | 1 |
| Temperature, ° F. | Ambient→ | | | Amb.-150 | Amb. | Amb. |
| Heat: | | | | | | |
| Time, hrs. | 7 | 6.5 | 8.5 | 6 | 7 | 12 |
| Temperature, ° F. | Amb.-452 | Amb.-450 | Amb.-449 | 155-450 | 130-447 | Amb.-446 |
| Reaction: | | | | | | |
| Time, hrs. | 9 | 9 | 9 | 9 | 9 | 9 |
| Temperature, ° F. | 447-454 | 454-390 | 442-454 | 446-453 | 446-453 | 446-461 |
| Cool: | | | | | | |
| Time, hrs. | 2 | 1.8 | 1.5 | 1.5 | 1 | 0.5 |
| Temperature, ° F. | 448-305 | 425-330 | 446-295 | 450-316 | 459-395 | 450-245 |
| Charge oil, silicone: | | | | | | |
| Time, hrs. | 0.2 | 0.2 | 0.1 | 0.1 | 0.15 | 0.1 |
| Temperature, ° F. | 305-234 | 330-252 | 295 | 316-185 | 305-210 | 245 |
| Steam hydrolyze: | | | | | | |
| Time, hrs. | 10 | 10 | 8 | 12 | 13 | 11 |
| Temperature, ° F. | 345-366 | 349-374 | 345-380 | 343-363 | 349-359 | 348-360 |
| $N_2$ strip: | | | | | | |
| Time, hrs. | 2 | 2 | 2 | 2 | 2 | 2 |
| Temperature, ° F. | 347-365 | 360-365 | 360 | 353-358 | 360 | 369-364 |
| Cool: | | | | | | |
| Time, hrs. | 5.5 | 4 | 4 | 3.5 | 3 | 2.5 |
| Temperature, ° F. | 356-152 | 365-150 | 352-142 | 355-142 | 360-115 | 264-162 |
| Charge methanol: | | | | | | |
| Time, hrs. | 0.1 | 0.1 | 0.1 | 0.1 | 0.1 | 0.1 |
| Temperature, ° F. | 125-134 | 150 | 142 | 142 | 115 | 143 |
| Mixture: | | | | | | |
| Time, hrs. | 4 | 4 | 4 | 4 | 4 | 4 |
| Temperature, ° F. | 134 | 130 | 117 | 140 | 130 | 124 |
| Settle: | | | | | | |
| Time, hrs. | 6 | 6 | 6 | 6 | 6 | 6 |
| Temperature, ° F. | 127 | 127 | 115 | 135 | 126 | 126 |
| Neut. No. hydrolyzed $P_2S_5$ polybutene | 66 | 64 | 62 | 59 | 54 | 49 |

TABLE IIB.—PREPARATION OF CARBONATED BARIUM SALT OF INORGANIC PHOSPHORUS ACID FREE HYDROLYZED P₂S₅-POLYBUTENE

| | A | B | C | D | E | F |
|---|---|---|---|---|---|---|
| Charge, lbs.: | | | | | | |
| Methanol | 77 | 88 | 28.5 | 33 | 33 | 33 |
| Raffinate (produced in Table IIA) | 180 | 200 | 65 | 75 | 75 | 75 |
| Mineral oil (100 SUS) | 21 | 14 | 3.5 | 4.3 | 4.3 | 4.4 |
| BaO | 20.5 | 23.3 | 7.6 | 8.8 | 8.8 | 8.8 |
| N-20 [1] | 5.5 | 6.3 | 2.0 | 2.3 | 2.3 | 2.3 |
| H₂O (steam) | 5.4 | 6.3 | 2.0 | 2.5 | 2.3 | 2.3 |
| Dimethylsilicone, mls | 50 | 50 | 50 | 50 | 50 | 50 |
| CO₂/s.c.f.h. (std. cu. ft. hr.) | 9.8 | 7.4 | 2.7 | 2.8 | 2.8 | 2.8 |
| Procedure: | | | | | | |
| Charge CH₃OH, BaO, oil, polysi., N-20: | | | | | | |
| Time, hrs | 0.5 | 21 | 0.5 | 0.5 | 0.5 | 9.5 |
| Temperature, °F | Amb.-122 | Amb.-119 | Amb. | Amb. | Amb. | Amb. |
| Mix: | | | | | | |
| Time, hrs | 0.5 | 1 | 0.5 | 0.5 | 0.5 | 0.5 |
| Temperature, °F | 141 | 130 | 143 | 137 | 131 | 133 |
| Heat and CO₂ blow: | | | | | | |
| Time, hrs | 8.0 | 5.5 | 2.5 | 7.5 | 4 | 3 |
| Temperature, °F | 150 | 149 | 153 | 151 | 150 | 136 |
| CO₂ blow: | | | | | | |
| Time, hrs | 2.5 | 2.5 | 7 | 2.5 | 2.5 | 3 |
| Temperature, °F | 162 | 164 | 166-220 | 162 | 163 | 155 |
| Hydrolyze: | | | | | | |
| Time, hrs | 1.5 | 1.5 | 0.75 | 0.75 | 2.5 | 0.5 |
| Temperature, °F | 167 | 167 | 183 | 177 | 170 | 177 |
| Heat and CO₂ blow: | | | | | | |
| Time, hrs | 3 | 4 | 3.5 | 3 | 2.5 | 2 |
| Temperature, °F | 170-300 | 179-298 | 185-300 | 183-299 | 175-295 | 180-300 |
| Strip: | | | | | | |
| Time, hrs | 2 | 2 | 2 | 2 | 2 | 2 |
| Temperature, °F | 300 | 300 | 302 | 301 | 300 | 303 |
| Filter: | | | | | | |
| Temperature, °F | 300 | 300 | 300 | 300 | | 300 |
| Pressure | 30+ | 30 | 16-20 | 30 | 30 | 30+ |
| Precoat, lbs | 1.5 | 1 | 0.5 | 0.5 | | 0.5 |
| Admix., lbs | 1 | 1 | 1 | 1 | 1 | 1 |
| Rate, gal./hr./ft.² | 0 | 1.15 | 4.3 | <1 | 0 | 0 |
| Clarity | Cloudy | Bright | Bright | Hazy | Gelled | |
| Neut. No. (Table IIA) | 66.3 | 64 | 62 | 59 | 54 | 49 |
| Product filtrate: | | | | | | |
| Water, wt. percent | | 0.1 | | | | |
| Sp. gr. 60/60° F | | 1.0226 | 1.0015 | | | |
| Flash, CIC, °F | | 300 | 390 | | | |
| Color, ASTM (dil) | | 3.5 | 3.0 | | | |
| Sulfur, wt. percent | | 0.61 | 0.66 | 0.6 | | |
| Barium, wt. percent | | 7.5 | 7.2 | 6.4 | | |
| Phosphorus, wt. percent | | 1.1 | 0.98 | 0.9 | | |
| Lumetron turbidity | | 2.5 | 8.5 | | | |
| H₂S, p.p.m | | | 4 | | | |
| Kin. vis., cs. at 210° F | | 106.79 | 98 | | | |
| Mineral oil content, wt. percent | 57.1 | 53.3 | 52 | 52.2 | 52.2 | 52.2 |

[1] N-20 is ethylene oxide adduct of nonylphenate.

*Example III.*—This example illustrates the criticality of employing steam as opposed to water in the treatment of the barium reacted hydrolyzed hydrocarbon-P₂S₅ reaction product.

Inorganic phosphorus acid free hydrolyzed polybutene (800 m.w.)-P₂S₅ intermediate raffinates were prepared broadly in accordance with the procedure set forth in Example I.

From these raffinates three runs were made to form the carbonated barium salt of the raffinate. In two of the runs (AA and BB), representative of the method of the invention, steam was employed in the hydrolysis and in one comparative run (CC) water was employed as the hydrolyzing agent. A comparison of the viscosities of the final product indicate the importance of employing steam. The test data and results are reported below in Table III.

TABLE IIIA.—RAFFINATE ANALYSIS

| Raffinate analysis | AA | BB | CC |
|---|---|---|---|
| Sulfur, wt. percent | 0.64 | 0.64 | 0.64 |
| Strip residue, wt. percent | 95.3 | 95.3 | 95.3 |
| Neut. No | 22.7 | 22.7 | 22.7 |
| Mineral oil content, wt. percent | 52.5 | 52.5 | 52.5 |

TABLE IIIB.—MANUFACTURE OF Ba SALT PRODUCT FROM RAFFINATE

| | AA | BB | CC |
|---|---|---|---|
| Charge, gms.: | | | |
| Methanol | 1,544 | 775 | 209 |
| Raffinate (Table IIA) | 1,697 | 850 | 2,546 |
| Mineral oil (100 SUS) | 198 | 99 | 297 |
| BaO | 198 | 99 | 297 |
| N-20 [1] | 53 | 27 | 79 |
| Water-steam | [2] 53 | [2] 27 | [3] 79 |
| Dimethylsilicone, mls | 3 | 2 | 2 |
| CO₂, s.c.f.h | 0.13 | 0.065 | 0.127 |
| Procedure: | | | |
| Charge, raffinate BaO, N-20, silicone: | | | |
| Time, hrs | 0.5 | .05 | 2 |
| Temperature, °F | Amb.-122 | 140 | Amb.-143 |
| Mix: | | | |
| Time, hrs | 0.5 | 0.5 | 1 |
| Temperature, °F | 141 | 140 | 140 |
| Heat and CO₂ blow: | | | |
| Time, hrs | 2.3 | 3.5 | 2.5 |
| Temperature, °F | 141-180 | 140-160 | 140-155 |
| CO₂ blow: | | | |
| Time, hrs | 2 | 2.5 | |
| Temperature, °F | 181 | 161 | 155 |
| Hydrolyze: | | | |
| Time, hrs | [2] 0.25 | [2] 0.15 | [3] 0.03 |
| Temperature, °F | 177 | 160 | 155 |
| Heat CO₂ blow: | | | |
| Time, hrs | 1.3 | 1.8 | 2.5 |
| Temperature, °F | 185-300 | 160-300 | 155-300 |
| Strip: | | | |
| Time, hrs | 2 | 2 | 2 |
| Temperature, °F | 302 | 300 | 303 |
| Filter: | | | |
| Temperature, °F | 325 | 350 | 250 |
| Pressure, p.s.i.g | 15 | 25 | 15 |
| Precoat, gms | 40 | 20 | 40 |
| Admix., gms | 50 | 25 | 50 |
| Rate, gal./hr./ft.² | 23 | 8.8 | 2.6 |
| Recovery, wt. percent | 94 | 85 | 87 |

[1] See Table IIB.
[2] Steam.
[3] Water.

TABLE IIIC.—BARIUM SALT PRODUCT

| | AA | BB | CC |
|---|---|---|---|
| Ba salt product filtrate: | | | |
| Water, wt. percent | 0.1 | | 0.2 |
| Sp. gr. 60/60° F | | 0.9798 | 0.9967 |
| Flash COC, ° F | 390 | 380 | |
| Color, ASTM (dil) | 2.5 | 3.5 | 3 |
| Sulfur, wt. percent | 0.62 | 0.53 | 0.55 |
| Barium, wt. percent | 7.3 | | 7.3 |
| Phosphorus, wt. percent | 0.9 | 1.0 | |
| Lumetron turbidity | 17.5 | 3.5 | 4 |
| $H_2S$, p.p.m | 40 | | 3 |
| Kin. vis., cs. at 210° F | 76.77 | | 185.94 |
| Mineral oil content, wt. percent | 57.4 | 57.5 | 57.5 |

We claim:

1. A method for preparing a readily filterable lubricating oil composition of a carbonated overbased barium salt of an inorganic phosphorus acid free, hydrolyzed hydrocarbon-phosphorus sulfide reaction product which comprises reacting a hydrocarbon with a phosphorus sulfide, forming a mineral oil concentrate of the resulting reaction product, hydrolyzing with steam said resulting reaction product until said resulting reaction product has a neutralization number between about 60 and 65, drying said concentrate of said hydrolyzed reaction product, contacting said dry concentrate with anhydrous methanol to form an extract phase containing inorganic phosphorus acid and a raffinate phase containing an inorganic phosphorus acid free, hydrolyzed hydrocarbon-phosphorus sulfide reaction product, reacting said raffinate phase with an inorganic compound selected from the group consisting of barium oxide and barium hydroxide in the presence of anhydrous methanol utilizing a mole ratio of barium compound to hydrolyzed hydrocarbon phosphorus sulfide reaction product of between about 1:1 and 2:1, contacting said resultant product with carbon dioxide and contacting the resultant salt forming reaction mixture with steam, contacting the steam treated reaction mixture with carbon dioxide, and filtering the carbonated product to form said composition.

2. A method for preparing a readily filterable lubricating oil composition containing a carbonated overbase barium salt of an inorganic phosphorus acid free, hydrolyzed hydrocarbon-phosphorus sulfide reaction product which comprises reacting a hydrocarbon with phosphorus sulfide in a hydrocarbon to sulfide mole ratio of between about 2:1 and 1:1 in the presence of between about 0.1 and 1 wt. percent sulfur basis said hydrocarbon at a temperature of between about 200 and 500° F., forming a mineral oil concentrate of the resulting reaction product containing 30–60 wt. percent mineral oil, hydrolyzing with steam said resulting concentrate at a temperature between about 200 and 500° F., until said concentrate has a neutralization number between about 60 and 65, drying the steamed concentrate with inert gas at between about 200 and 500° F., contacting the dried concentrate with between about 0.25 and 1 volume anhydrous methanol per volume of said concentrate at a temperature between about 50 and 140° F. to form an extract phase containing inorganic phosphorus acid and a raffinate phase containing an inorganic acid free, hydrolyzed hydrocarbon-phosphorus sulfide reaction product, reacting said affinate phase with an inorganic compound selected from the group consisting of barium oxide and barium hydroxide at a temperature between about 140 and 300° F., in the presence of between about 5 and 40 moles of anhydrous methanol per mole hydrolyzed product and between about 1 and 2 moles of said inorganic compound per mole hydrolyzed product, contacting the resultant salt product with carbon dioxide at a temperature between about 140 and 300° F. utilizing a mole ratio of carbon dioxide to said inorganic compound of between about 0.5:1 and 2:1, contacting the carbonated product with steam at a temperature between about 150 and 200° F. utilizing between about 0.5 and 4 moles of steam per mole of carbonated product, contacting the steamed product with carbon dioxide at a temperature between about 170 and 350° F. utilizing a mole ratio of carbon dioxide to steamed carbonated product of between about 0.5 to 4 and filtering the resultant dried product to recover said composition as filtrate.

3. A method in accordance with claim 1 wherein said hydrocarbon is an olefin containing at least 12 carbon atoms, said phosphorus sulfide is phosphorus pentasulfide.

4. A method in accordance with claim 2 wherein said hydrocarbon is polybutene of a molecular weight of about 800 and said phosphorus sulfide is phosphorus pentasulfide.

References Cited

UNITED STATES PATENTS 3,135,729   6/1964   Kluge et al. _____ 260—139

DANIEL E. WYMAN, Primary Examiner

I. VAUGHN, Assistant Examiner